United States Patent [19]
Hawkins

[11] Patent Number: 4,721,322
[45] Date of Patent: Jan. 26, 1988

[54] ANTI-DIVE BRAKING APPARATUS

[76] Inventor: Robert W. Hawkins, 622 DeNova, LaCanada, Calif. 91011

[21] Appl. No.: 875,347

[22] Filed: Jun. 17, 1986

[51] Int. Cl.$^4$ .............................................. B62K 25/08
[52] U.S. Cl. .................................. 280/276; 188/272; 267/195; 280/703
[58] Field of Search ............... 280/703, 276, 707, 708, 280/DIG. 1; 180/219; 188/272, 313; 267/8 R, DIG. 1

[56] References Cited

U.S. PATENT DOCUMENTS

| | | | |
|---|---|---|---|
| 3,173,671 | 3/1965 | Broadwell | 280/DIG. 1 X |
| 3,537,715 | 11/1970 | Gualdoni | 280/703 X |
| 4,159,105 | 6/1979 | Van der Laan et al. | 267/8 R |
| 4,367,882 | 1/1983 | Alexander et al. | 280/276 |
| 4,437,678 | 3/1984 | Schultz | 280/276 |
| 4,524,844 | 6/1985 | Williams, Jr. | 280/276 X |

FOREIGN PATENT DOCUMENTS

| | | | |
|---|---|---|---|
| 56-25008 | 3/1981 | Japan | 280/703 |
| 2073680 | 10/1981 | United Kingdom | 280/703 |

OTHER PUBLICATIONS

European Patent Application, published 5/84, Van Eyden, 280/276, #0 108 441.

Primary Examiner—John J. Love
Assistant Examiner—Charles R. Watts
Attorney, Agent, or Firm—George A. Bode; D. Neil LaHaye

[57] ABSTRACT

A vehicle anti-dive braking apparatus which prevents dive and increases suspension damping during braking. A rotatably mounted disc brake causes hydraulic fluid to flow from hydraulic reservoirs upon braking to an anti-dive cylinder, secondary damper cylinder and a bottom casing. Fluid flow to the anti-dive cylinder causes movement of a fork pipe therein to prevent dive while simultaneously causing valves in the secondary damper cylinder and bottom casing to close. The closing valves retain fluid pressure therein and thereby increase suspension damping. The damper in the bottom casing also provides increased suspension damping when a bump is encountered during braking action.

10 Claims, 2 Drawing Figures

ANTI-DIVE BRAKING APPARATUS

BACKGROUND OF THE INVENTION

1. Field of the Invention

The present invention relates to braking apparatus and more particularly to braking apparatus which interact with suspension members to counteract the tendency of the front suspension of a vehicle to "dive" when the braking mechanism is applied.

2. General Background

Front suspension members on vehicles such as automobiles and motorcycles generally comprise shock absorbers which utilize coil springs and hydraulic fluid chambers to provide a smooth ride for the operator and passengers of the vehicle by damping the impact of irregularities encountered in the road surface. Upon application of the brakes while traveling, the inertia or forward momentum of the vehicle tends to cause compression of the front suspension and diving of the front of the vehicle. The amount of dive is directly proportional to the braking force applied and has the adverse effects of reducing effective suspension travel, effecting the weight distribution and pitch or level attitude of the vehicle, and, therefore, affecting the steering geometry and handling characteristics of the vehicle. The above has been recognized in the art and a variety of approaches have been directed toward the problem.

Japanese Pat. No. 56-25008 entitled "Anti-Dive Device for Motorcycle" discloses a device which feeds braking hydraulic pressure into an annular hydraulic pressure chamber and presses an elastic braking material against the fork pipe to prevent sinking action of the fork pipe when sudden braking is applied.

U.S. Pat. No. 4,392,664 entitled "Front Fork Of Motorcycle" discloses a fork assembly wherein the bottom casing is filled with oil and has a pipe seat anchored in the bottom portion of the casing with its upper end slidably fitted to the fork pipe. An oil passage providing communication between the inside and outside of the pipe seat has a plunger equipped with a valve for opening and closing the oil passage which is adapted to slide in co-action with a braking mechanism. Application of the braking mechanism causes oil flow to increase shock absorber damping and reduce diving.

U.S. Pat. No. 4,367,882 entitled "Suspension Apparatus" discloses a suspension apparatus on the front wheel of a motorcycle wherein a hydraulic cylinder is attached between the suspension and the front wheel for converting the frictional force from any substantial braking to an approximate proportional hydraulic force with adjustable damping means for applying the hydraulic force to the suspension so as to oppose and largely counterbalance the inertial force from braking and reduce front end diving.

U.S. Pat. No. 4,437,678 entitled "Vehicular Suspension" disclosed a suspension which includes adjustment means coupled to the braking mechanism and operable in response to braking torque to increase the resilient loading of the suspension to reduce diving during braking.

U.S. Pat. Nos. 4,295,658 entitled "Front End Shock Absorbing Apparatus For Wheeled Vehicle", 3,774,935 entitled "Pirch Suppressing System", 3,945,664 entitled "Vehicle Hydromatic Suspension System", and 2,856,200 entitled "Vehicle Shock Absorber Brake Dive Arrester" all teach systems for increasing the resilient loading of the suspension to reduce diving during braking.

U.S. Pat. No. 4,159,123 entitled "Motorcycle Braking Mechanism Including Means For Controlling Telescoping Action Of The Front Fork Means" discloses a rod interconnecting the upper portion of the suspension to the brake plate so that braking action applies a torquing force which is translated into a linear force via the rod to reduce downward movement of the fork relative to the slider.

U.S. Pat. No. 2,778,656 entitled "Inertia Controlled Fluid Pressure Suspension For Vehicles" discloses a fluid spring suspension and pendulum weight activated valves for adjusting suspension height and tire presure during cornering and braking to reduce bank and dive of the vehicle.

All but two of the above patents teach increasing damping of the suspension to reduce diving. This is not totally effective as suspension travel is also reduced. The final two patents are directed to elevation of the suspension but do so by means which are either cumbersome or not practical for a variety of vehicles.

SUMMARY OF THE PRESENT INVENTION

The preferred embodiment of the apparatus of the present invention solves the aforementioned problems in a straight forward and simple manner by combining means for hydraulically elevating or increasing the effective length of the suspension and means for increasing the damping effect of the suspension. The usual suspension damper and spring are utilized as a primary damper and primary spring and provide normal suspension while the vehicle is in motion. A secondary damper and secondary spring serve as the means for increasing the damping effects of the suspension when the braking mechanism is applied. The means for elevating or increasing the effective length of the suspension is generally comprised of a hydraulic cylinder which acts in combination with the primary and secondary damping means to prevent diving of the suspension during braking of the vehicle. The hydraulic elevating means and means for increasing the damping effect of the suspension are activated by application of the brakes on the wheel to which the suspension is attached. The brakes would use preferrably a disc brake (although a drum brake or oil engine-oil pump brake, etc. could be used) having a floating caliper rotatably mounted to the axle of the wheel. Application of the brakes causes movement or rotation of the caliper in the rotational direction of the wheel due to resistance between the caliper and disc (or drum and cylinder or pressures exerted from the oil flow on the oil pump, oil engine, etc., as the case may be). The brake calipers interact with the suspension by means of a pair of hydraulic cylinders attached to the brakes. The hydraulic cylinders are activated upon application of the brakes and rotation thereof to provide hydraulic pressure to the suspension for activating the means for hydraulically elevating the suspension and means for increasing the damping effect of the suspension.

In view of the above, it is an object of the present invention to provide a suspension which prevents front end diving during braking.

It is a further object of the present invention to provide a suspension which prevents diving while maintaining full suspension.

It is a further object of the present invention to provide an anti-dive suspension which is activated by braking action.

It is a further object of the present invention to provide an anti-dive system with an anti-locking braking mechanism so that a vehicle not only will not lock its brakes, but will not dive when braking.

In view of the above objects, it is a feature of the present invention to provide means for elevating or increasing the effective length of the suspension relative to the vehicle.

It is another feature of the present invention to provide a disc brake (or drum brake or oil engine-oil pump type brake) on a revolving axis which activates the system.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
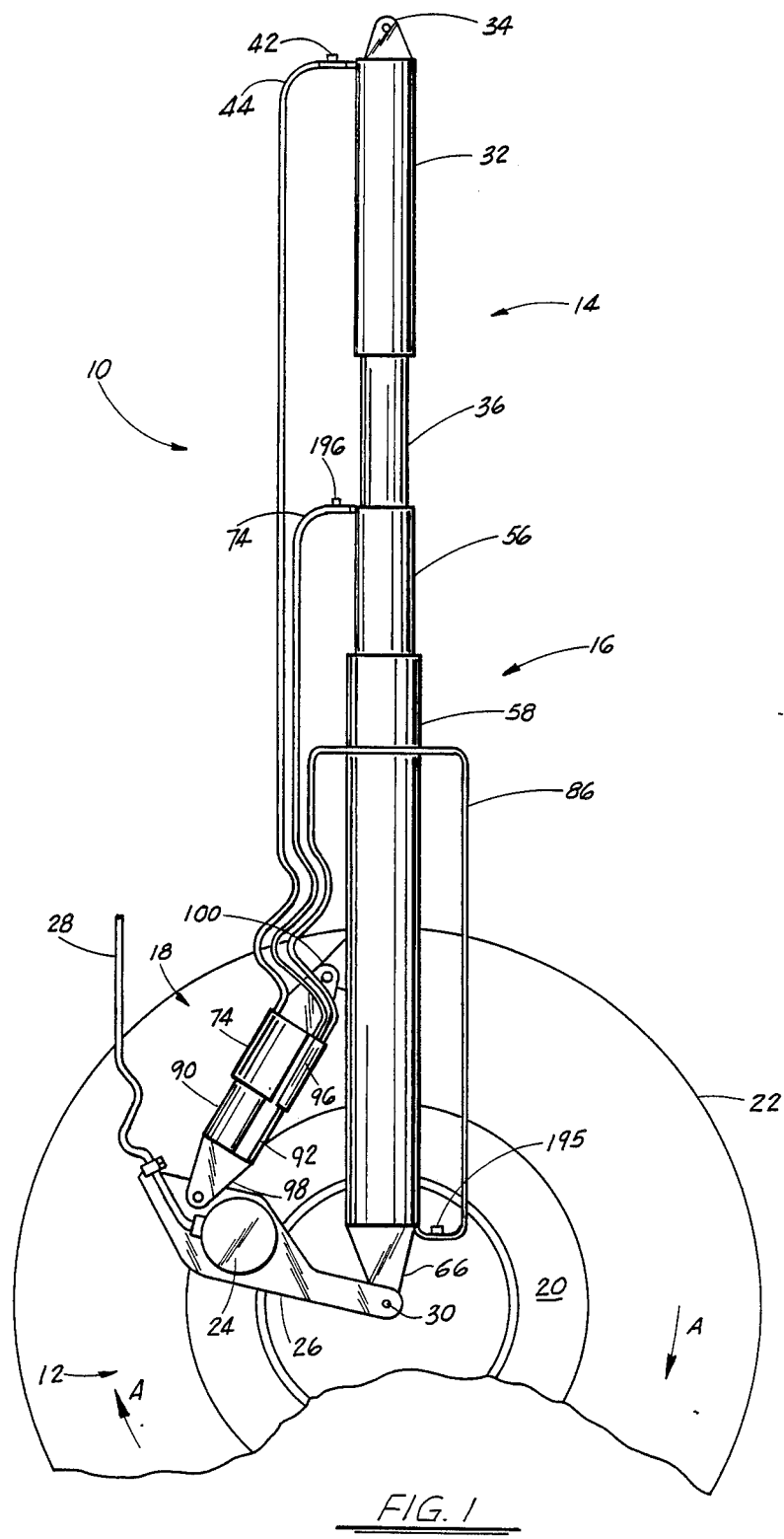
FIG. 1 is a side view of the preferred embodiment of the apparatus of the present invention mounted upon the wheel of a vehicle.

Referring now to the drawing, and in particular FIG. 1, the apparatus of the present invention is designated generally by the numeral 10. Mechanism 10 is generally comprised of disc brake means 12, anti-dive means 14, suspension strut 16, and hydraulic means 18 for activating anti-dive means 14 and suspension strut 16. It is to be understood that brake means 12 is, in the preferred embodiment, an hydraulic disc brake; however, drum brakes or oil engine-oil pump brakes, and the like may be suitably substituted.

As best seen in FIG. 1, disc brake means 12 is preferably a hydraulic brake compirsed of disc 20 mounted for rotation with wheel 22, disc brake caliper unit 24 mounted on brake arm 26 adjacent disc 20, and hydraulic brake line 28. Brake arm 26 is rotatably mounted at one end on axle 30 to allow limited rotational movement about axle 30 of wheel 22. Brake arm 26 is mounted to allow rotational movement from its first normal position in the same direction of rotation given to wheel 22, as indicated by ARROWS A, during forward motion of the vehicle. Upon application of the brakes by the operator, hydraulic pressure created in brake line 28 causes caliper 24 and brake pads (not shown) to engage disc 20 for braking of the vehicle. The resistance between caliper 24 and rotating disc 20 results in rotation of caliper 24 and arm 26, which causes activation of anti-dive means 14 and suspension strut 16 to prevent dive and increase damping of suspension strut 16, to be further explained herein.

Figure 2:
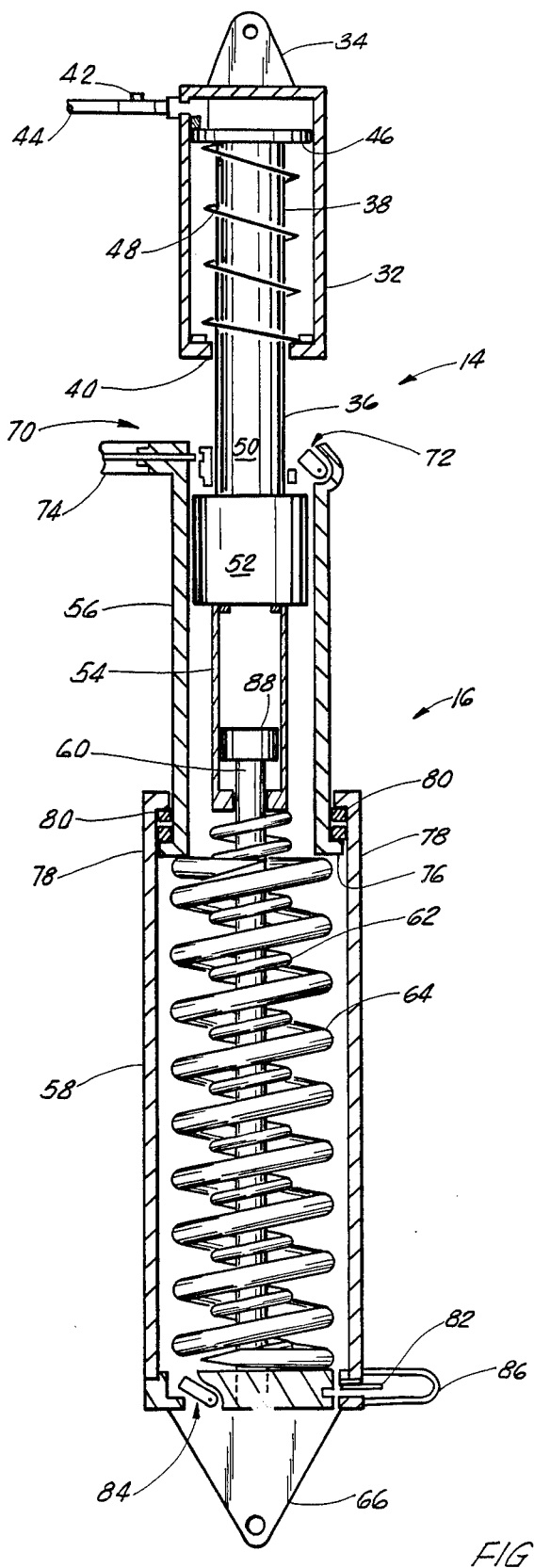
FIG. 2 is a sectional view of the anti-dive means of the apparatus of FIG. 1.

Referring now to FIG. 2, anti-dive means 14 is comprised of anti-dive cylinder 32, attached to the frame of the vehicle by first flange 34. and fork pipe 36, having its upper end 38 slidably received in anti-dive cylinder 32. Anti-dive cylinder 32 is preferrably a tubular cylinder such as those commonly used in vehicle suspension systems which slidabley receive fork pipe 36 and is provided with inwardly extending seal 40. Seal 40 allows telescoping motion of fork pipe 36 within cylinder 32 while preventing loss of fluid from cylinder 32. Cylinder 32 receives hydraulic fluid through adjustable valve 42 and first hydraulic line 44 upon application of the vehicles brakes, to be further explained herein. Fluid flow into cylinder 32 exerts pressure against enlarged head 46 to cause movement of cylinder 32 and fork pipe 36 relative to each other. During braking, this prevents dive by elevating the frame, suspension or by increasing the effective length of the suspension and maintaining a level pitch attitude of the vehicle. Cylinder 32 is provided with return spring 48 to assist in returning fork pipe 36 to its first normal position from its second extended position upon cesation of braking and reduction of hydraulic pressure in cylinder 32. Spring 48 is considered as a secondary source of presure to return fork pipe 36 to its first normal retracted position as the weight of the vehicle at flange 34 provides the primary pressure. Fork pipe 36 is provided at its lower end 50 with piston 52 and primary damper cylinder 54, which are slidably received by suspension strut 16.

Suspension strut 16 is generally comprised of secondary damper cylinder 56, bottom casing 58, primary fluid damper rod 60 defining a piston 88 at its upper portion and connected to base 66, primary spring damper 62, and secondary spring damper 64. Second flange 66 at the lower end of bottom casing 58 is attached to axle 30 to complete the suspension connection with the frame of the vehicle.

Secondary damper 56 is preferably a tubular cylinder which slidably receives piston 52 and primary damper cylinder 54 therin. Secondary damper cylinder 56 is provided at its upper end 68 with first valve 70 and first gate 72. Hydraulic fluid pressure in second hydraulic line 74 causes first valve 70 to move from a first normal open position to a second closed position in sliding contact with fork pipe 36. This hydraulic fluid pressure is received from hydraulic activation means 18 upon application of the brakes by the operator. Movement of piston 52 toward lower end 76 of secondary damper cylinder 56 when first valve 70 is in its second closed position creates suction at first gate 72, thereby causing first gate 72 to close. This provides a seal which effectively preents further movement of fork pipe 36 within secondary damper cylinder 56 and also allows movement of piston 52 upward toward first gate 72 allowing piston 52 to be "trapped" as close as possible to first gate 72 so maximum travel of piston 52 to primary fluid damper piston 88 is achieved. In the case where braking is applied and the vehicle encounters a bump, and piston 52 is abutting piston 88, piston 52 would be able to rise up and away from piston 88 when the bump has been passed by and travel of second flange 66 away from flange 34 will tend to extend anti-dive means 14 and piston 52 would be able to move upward from wheel 22 and remain there to drive the braking means 12. Fork pipe 36 and secondary damper cylinder 56 then act essentially as a single fork pipe in a standard suspension. The major difference however, is that the relative movement between fork pipe 36 and anti-dive cylinder 32 serve to prevent dive during braking. Seals 78, 80 provided on secondary damper cylinder 56 and bottom casing 58 serve to maintain fluid pressure therebetween to provide the secondary fluid damping action when a bump is encountered during braking and secondary damper cylinder 56 slides within bottom casing 58.

Bottom casing 58 is preferably a tubular cylinder such as that normally utilized in vehicle suspension systems and has primary fluid damper 60, primary spring damper 62, and secondary spring damper 64 mounted therein. Casing 58 is also provided at one end, preferrably the lower end, with second valve 82 and second gate 84. Second valve 82 is similar to first valve 70 in that it is actuated to move from a first normal open position to a second closed position upon recipt of hydraulic fluid pressure from third hydraulic line 86 during braking of the vehicle. Closing of second valve 82 alos causes second gate 84 to close, thereby preventing fluid flow into or out of bottom casing 58. It can thus be seen that this results in increased fluid pressure inside of bottom casing 58 upon downward movement of secondary damper cylinder 56 and increased fluid dampening of the suspension. Primary fluid damper piston 88 on rod 60 is slidably received in primary damper cylinder 54 and provided normal fluid damping of the suspension while the vehicle is in motiom. Primary spring damper 62 is seated between the lower end of bottom casing 58 and primary damper cylinder 54 and provides normal spring damping of the suspension while the vehicle is in motion. Second damper cylinder 56 and secondary spring damper 64 respectively provide secondary or additional fluid and spring damping when the brakes are applied and a bump is encountered as secondary spring damper 64 is seated between the lower end of bottom casing 58 and secondary damper cylinder 56.

Hydraulic means 18 is preferrably mounted at approximately a forty-five (45°) angle to bottom casing 58 or other means that would be connected to axle 30 and is generally comprised of first and second hydraulic fluid sources such as first and second hydraulic pistons 90, 92 and first and second hydraulic fluid reservoirs 94, 96 respectively. Pistons 90, 92 are attached to brake arm 26 adjacent caliper unit 24 at lower attachment point 98. Fluid reservoirs 94, 96 are attached to bottom casing 58 at upper attachment point 100. First hydraulic fluid line 44 is in fluid communication with first fluid reservoir 94 and second and third hydraulic fluid lines 74, 86 are in fluid communication with second fluid reservoir 96. Upon application of the brakes by the operator, brake means 12 rotates in the direction of wheel rotation indicated by ARROWS A and causes first and second hydraulic pistons 90, 92 to move into fluid reservoirs 94, 96 respectively. This forces hydraulic fluid through hydraulic lines 44, 74, and 86, forcing fluid into anit-dive cylinder 32 and also causing closing of first and second valves 70, 82. The degree of closing varies depending on how hard the the braking means 12 is applied and how fast the vehicle is mvoing, and, the degree of closing, determines the application of the secondary damper 56 and spring 64. (In other words, the secondary damper 56 and spring 64 are variable in their asistance to the primary damper 54 and spring 62).

In operation, when the vehicle is in motion and not under braking, suspension 10 acts as a normal suspension in receiving and damping road surface irregularities. When a bump is encountered, bottom casing 58 deflects upwardly and primary fluid damper 60 and primary spring damper 62 provide normal suspension damping. Secondary damper cylinder 56 and secondary spring damper 64 have no effect as secondary spring damper 64 causes upward deflection of secondary damper cylinder 56 in unison with bottom casing 58.

When the vehicle is in motion and the brakes are applied, the braking resistance on caliper unit 24 and brake arm 26 causes rotation thereof and movement of hydraulic pistons 90, 92. This causes hydraulic fluid flow through first, second and third hydraulic fluid lines 44, 74, and 86 respectively. First hydraulic fluid line 44 provides fluid through adjustable valve 42 to anit-dive cylinder 32. This fluid flow into cylinder 32 against piston 46 prevents dive during braking by moving piston 46 away from the top portion of anti-dive cylinder 32. This elevates or increases the effective length of the suspension relative to the frame of the vehicle which is attached at first flange 34. Adjustable valves 42, 195 and 196 are provided so that the amount of fluid flow therethrough may be tailored to suit the needs of the operator and the amount of anit-dive characteristics of the mechanism. It may also be possible to adjust valve 42 to allow frame lift during braking. Fluid flow in second and third hydraulic lines 74, 86 causes similtaneous closing of first and second valves 70, 82. Closing of first valve 70 and initial downward movement of fork pipe 36 in secondary damper cylinder 56 causes closing of first gate 72 due to suction from negative air flow therefrom. This, coupled with the closing of second gate 84 caused by second valve 82, prevents fluid (air) from exiting secondary damper cylinder 56 and causes cylinder 56 and fork pipe 36 to act as a single unit to increase fluid damping pressure in bottom casing 58. However, slight closing (light braking) of second valve 70 would allow some slippage of piston 52 in the direction of second flange 66—the result of which is advantageous as it is desirable to have total closure of valves 70, 82 only when braking is the hardest. Thus, varying the "hardness" of braking will vary the "hardness" of suspension. At the same time, pressure from cylinder 56 against secondary spring damper 64 provides increased or secondary spring damping. These both act to stiffen the suspension, also helping to prevent dive, beyond that provided by primary fluid damper and spring 60, 62 during normal braking and when a bump is encountered during braking. It can this be seen that the invention provides a unique and adjustable means for preventing dive and increasing suspension damping.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A vehicle anti-dive braking apparatus comprising:
   (a) brake means rotatably mounted on the axle of a wheel of said vehicle;
   (b) anti-dive means mounted on the frame of said vehicle;
   (c) a suspension strut mounted on the axle of said wheel of said vehicle and in sliding engagement with said anti-dive means, said suspension strut further comprising:
      i. a damper cylinder in sliding engagement with said anti-dive means;
      ii. a bottom casing attached to the axle of said vehicle and in sliding engagement with said damper cylinder;
      iii. a first damper housed within said bottom casing;
      iv. a first spring damper housed within said bottom casing; and
      v. a second spring damper housed within said bottom casing; and,
   (d) means attached to said brake means and in fluid communication with said anti-dive means and said suspension strut for hydraulically actuating said anti-dive means and said suspension strut.

2. The apparatus of claim 1, wherein said hydraulic actuation means actuates said anti-dive means and said suspension struct upon application of said brake means of said vehicle.

3. The apparatus of claim 1, wherein said brake means further comprises:
(a) a brake arm rotatably mounted at one end on the axle of said wheel of said vehicle; and,
(b) a brake caliper unit mounted on said brake arm.

4. The apparatus of claim 1, wherein said anti-dive means comprises:
(a) an anti-dive cylinder attached to said frame of said vehicle and in fluid communication with said hydraulic actuation means; and
(b) a fork pipe means slidably received in said anti-dive cylinder and in sliding engagement with said suspension strut.

5. A vehicle anti-dive braking apparatus comprising:
(a) a brake arm rotatably mounted at one end on the axle of a wheel of a vehicle;
(b) a brake caliper unit mounted on said brake arm;
(c) anti-dive means mounted on the frame of said vehicle;
(d) a suspension struct mounted on the axle of said wheel of said vehicle and in sliding engagement with said anti-dive means; said suspension strut further comprising:
 i. a damper cylinder in sliding engagement with said anti-dive means;
 ii. a bottom casing attached to the axle of said vehicle and in sliding engagement with said damper cylinder;
 iii. a first damper housed within said bottom casing;
 iv. a first spring damper housed within said bottom casing; and,
 v. a second spring damper housed within said bottom casing; and,
(e) means attached to said brake means and in fluid communication with said anti-dive means and said suspension strut for hydraulically actuating said anti-dive means and said suspension strut.

6. The apparatus of claim 5, wherein said hydraulic actuation means supplies hydraulic fluid to said anti-dive means and said suspension strut in response to application of said brake means and rotation thereof.

7. The apparatus of claim 5, wherein said anti-dive means comprises:

(a) an anti-dive cylinder attached to the frame of said vehicle and in fluid communication with said hydraulic actuation means; and
(b) a fork pipe means slidably received in said anti-dive cylinder and movable between a first normal retracted position and a second extended position in said cylinder and in sliding engagement with said suspension strut.

8. A vehicle anti-dive braking apparatus comprising:
(a) brake means rotatably mounted on the axle of a wheel of said vehicle;
(b) an anti-dive cylinder attached to the frame of said vehicle;
(c) fork pipe means slidably received in said anti-dive cylinder and movable between a first normal retracted position and a second extended position in said anti-dive cylinder;
(d) a first damper cylinder in sliding engagement with said fork pipe means;
(e) a bottom casing attached to the axle of said wheel of said vehicle and in sliding engagement with said first damper cylinder; and,
(f) hydraulic fluid means attached to said brake means and in fluid communication with said anti-dive cylinder, said secondary damper cylinder, and said bottom casing for providing hydraulic fluid to said cylinders and casing.

9. The apparatus of claim 8, wherein rotation of said brake means in response to braking action actuates the flow of hydraulic fluid from said hydraulic fluid means.

10. The apparatus of claim 8, further comprising:
(a) at least one adjustable valve mounted on said anti-dive cylinder for controlling the quantity of hydraulic fluid delivered thereto and thereby adjusting the amount of travel of said fork pipe between said first and second positions;
(b) a first valve on said second damper cylinder in fluid communication with said hydraulic fluid means movable form a first normal open position to a second closed position in response to hydraulic fluid pressure, thereby preventing sliding movement of said fork pipe within said second damper cylinder; and
(c) a second valve mounted on said bottom casing in fluid communication with said hydraulic fluid means movable from a first normal open position to a second closed position in response to hydraulic fluid pressure, thereby increasing fluid damping pressure in said bottom caing.

* * * * *